United States Patent [19]

Mallick et al.

[11] 4,191,718

[45] Mar. 4, 1980

[54] THICK SECTION COMPRESSION MOLDED COMPOSITES

[75] Inventors: Pankaj K. Mallick; Narasimhan Raghupathi, both of Westland, Mich.

[73] Assignee: Ford Motor Company, Dearborn, Mich.

[21] Appl. No.: 861,801

[22] Filed: Dec. 19, 1977

[51] Int. Cl.² ............................................. B29C 25/00
[52] U.S. Cl. ....................................... 264/26; 264/236; 264/237; 264/331; 264/347; 264/348
[58] Field of Search ....... 264/237, 331, 348, DIG. 65, 264/236, 347, 25, 26

[56] References Cited

U.S. PATENT DOCUMENTS

| | | | |
|---|---|---|---|
| 2,288,321 | 6/1942 | Nordlander et al. | 264/DIG. 65 |
| 2,579,596 | 12/1951 | Minter et al. | 264/337 |
| 2,713,697 | 7/1955 | Willcox | 264/DIG. 65 |
| 3,856,885 | 12/1974 | Furuya et al. | 264/331 |

OTHER PUBLICATIONS

Modern Plastics Encycloped. 1970–1971, vol. 47, No. 10A, Oct. 1970, pp. 466, 471, 472.
Bjorksten, Polyesters and Their Applications, Reinhold Pub. Corp., New York, 1956, pp. 102, 103, 108 and 109.

Primary Examiner—James H. Derrington
Attorney, Agent, or Firm—Edmund C. Ross, Jr.; Olin B. Johnson

[57] ABSTRACT

Mechanical properties of compression molded composites having thick sections and made from molding compounds comprising thermosetting resin and reinforcing fiber in a thickened dispersion are improved by a preheating stage and mold cycle times that are longer than the time necessary to reach the highest peak exotherm temperature of the composite during molding. Slow post cooling allows for development of properties especially when mold opening times are shorter than that required for removal of all thermal gradients.

5 Claims, 6 Drawing Figures

THICK SECTION COMPRESSION MOLDED COMPOSITES

BACKGROUND OF THE INVENTION

Reinforced plastics, particularly fiber reinforced composites made with thermosetting resins, have long been known as capable of providing lightweight structural components. High volume use of such composites as in automotive applications has included compression molded components of thin cross section.

Making thicker section components by compression molding involves consideration of factors as reaction kinetics, heat transfer and rheology during molding and thereafter. A particularly acute problem is establishing an economically feasible mold cycle time that allows for development of mechanical properties of the final composite to their fullest extent.

THE INVENTION

This invention relates to a method of producing thick section structural composites by compression molding of molding compounds comprising reinforcing fiber and thermosetting resin in a thickened dispersion at mold cycle times that permit attainment of desirable ultimate mechanical properties for the composite but are not unduly long.

Mechanical properties of thick section components such as flexural and interlaminar shear strength are dependent upon mold cycle time. It has been found that improved mechanical properties are obtained, if the mold cycle is longer than the time at which the peak internal exotherm occurs.

Higher mold temperature reduces the time at which the peak internal exotherm occurs but can have deleterious effects on physical properties, especially since such higher temperature also raises the peak internal exotherm temperature which, in turn, causes higher thermal gradients within the composite during molding. It is found that preheating the molding compound, prior to its molding under heat and pressure, reduces not only the time required to reach the peak internal exotherm but also advantageously lowers the peak internal exotherm temperature.

Although particularly advantageous properties are obtained when the mold cycle is lengthened to that where no thermal gradients exist in the molded composite, it is still further found that shorter mold cycle times can be tolerated by a post cooling stage thereby providing advantageous properties at reduced mold cycle times.

DETAILED DESCRIPTION OF THE INVENTION

Figure 1:
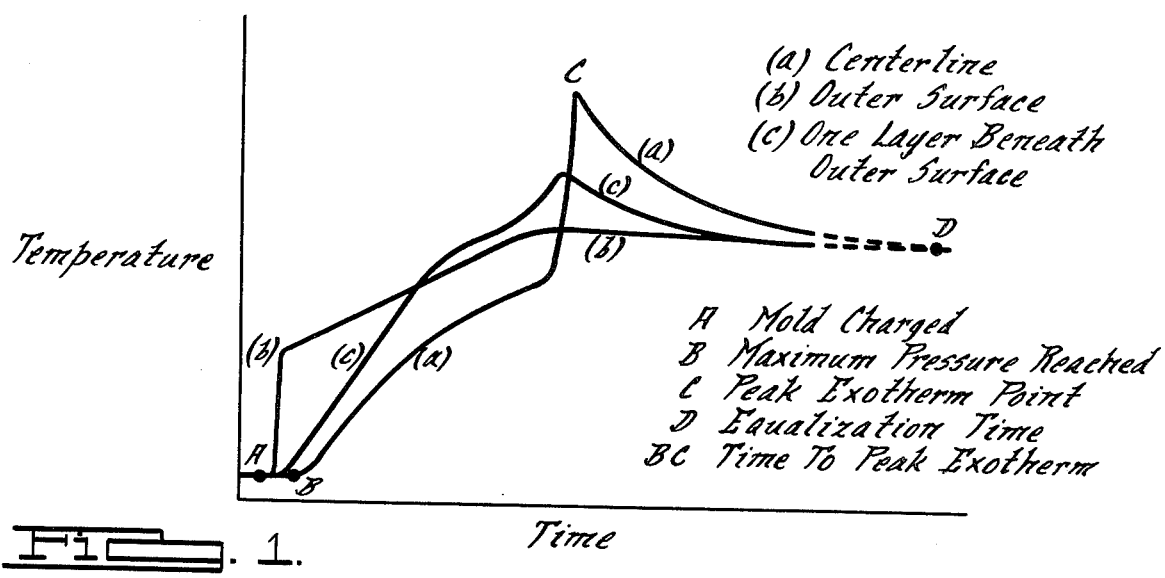
FIG. 1 illustrates, in a schematic way, the temperature variation within a simple shaped molding during compression molding of a layered molding compound. Each layer as well as the outermost surface increases in temperature to a peak temperature and has a peak exotherm.

This invention relates to structural composites comprising relatively thick cross sections, e.g. above about $\frac{1}{4}$ inch as about $\frac{1}{2}$-1 inch or more, and, includes, in particular, compression molding processes using heat and pressure for making these composites.

The molding compounds that are suitable to make the structural composites herein include well known and commercially available materials sometimes referred to in abbreviated form as SMC, HMC, HSMC, XMC and DSMC. Examples of such molding compounds appear in U.S. Pat. Nos. 3,391,222; 3,261,886; 3,642,672; 3,701,748 as well as British Patent No. 936,351. These compounds generally comprise reinforcing fiber (e.g., glass) at up to about 75% by weight and thermosetting resin such as polyester or vinyl ester prepolymers as well as aryl monomer or prepolymer crosslinkers normally within a range of about 15–50% by weight of the total weight of the molding compound. Other thermosetting resins include those of the epoxy type cured by crosslinking as with amine or anhydride. Other ingredients in the molding compounds typically include a catalyst (e.g. organic peroxy compound as benzoyl peroxide for polyester or vinylester prepolymer resins) normally at about 0.5–2% by weight, thickener (e.g., magnesium oxide) at about 1–15% by weight as well as filler (e.g., calcium carbonate) at about 40% by weight, all weight percents being by weight of the total weight of the molding compound. Still other ingredients as mold release agents, e.g., zinc stearate, pigments, thermoplastic resins (for shrink control) and polymerization inhibitors (e.g., alkyl phenols) are normally included in minor amounts, e.g., up to 10% by weight of the total weight of the molding compound.

Of special interest for high strength composites are such molding compounds with high glass fiber content, e.g., about 50–75% by weight of the total weight of the molding compound, which may be either chopped strand or continuous. Chopped strand glass fiber is normally randomly oriented and about $\frac{1}{2}$–1" long in SMC, HMC and HSMC, whereas the long fiber may be oriented as in those molding compounds referred to as XMC where, for example, the fibers are continuous and oriented in an X-fashion or DSMC where both chopped fiber and directional long fibers (e.g., about 6" long) are employed.

The molding compounds such as SMC, HMC, HSMC and DSMC suitable herein are highly viscous materials of a consistency that allows for handling in sheet form to provide layered charges. They are typically made by forming a resin dispersion on a continuous backing material as a thin sheet of polyethylene (about 1 mil) onto which dispersion reinforcing fiber is dropped and embedded. Another backing sheet is placed on top and the so sheeted material is rolled and placed into a cooler for aging. After aging for several hours up to several days, the backing sheets are removed and the thin layer molding compound cut into suitable size for charging into the mold. A layer of molding compound, no longer molten after aging, typically will have a thickness in a range below about 0.3 inches, normally between about 0.05–0.2 inches, although thicker materials can be used in the process herein. Most often, several layers of molding compound are used as a single charge for molding and the height or thickness of the charge is greater than the final thickness of the corresponding section of the molded composite.

In preparation of other types of molding compounds such as those referred to as XMC, glass fibers are drawn through a resin dispersion and then wound on a mandrel to any desired angle and thickness or shape as, for example, the shape of the final composite.

Essential to this invention is preheating the molding compound or portion thereof to a temperature at least about 100° F., prior to its compression molding under heat and pressure. This preheating is conveniently accomplished using dielectric heating of the charge or portion thereof to be molded, although other heating means, e.g. air circulating oven, may be employed.

Importantly, the molding compound is preheated below that temperature which would cause its premature gelling in the mold identified as by a coarseness and whitening of the surface of the final molded composite. As pregelling is dependent on factors as molding compound ingredients including catalyst and resin type and amount, rate and length of preheating, as well as mold temperature, a certain amount of experimentation is necessary to obtain an optimum preheating. Good results are seen with high glass content (e.g. about 50% by weight or more) molding compounds as DSMC obtained from Owens-Corning Fiberglass as XMC and HMC obtained from PPG using a dielectric preheating schedule such that the layers of molding compound to be charged are heated to a temperature in a range about 100°–180° F. in about 50–60 seconds before placing in the mold. Preheating these compounds to a temperature of 220° F., however, causes pregelling if the relative mold temperature is too high, e.g., 300° F. or higher. Preheating to such higher temperatures, e.g., 200° F. or above, can be tolerated, however, in such circumstances as when a mold temperature is employed that is closer to the temperature reached by preheating. Thus, for example, the molding compound may be preheated to above about 210° F. with the mold temperature set at 220° F. to obtain desirable results.

Preferred preheating for large objects as automotive wheels and the like include raising the temperature of the molding compound up to about 200° F. in less than 3 minutes, more preferably less than about 2 minutes as $\frac{1}{2}$–1 minute and a mold temperature in a range of about 250°–350° F. For such objects, peak pressures in a range above about 1000 psi, more preferably about 1500–3500 psi are suitable.

One important advantage of preheating is reduction of the time required to reach the peak internal exotherm during molding. The peak internal exotherm is resultant of the imbalance between (1) heat generated in the composite during the exothermic crosslinking reaction and (2) heat transfer in the composite, such that heat generated is more readily transferred away from the surface but less so from the centerline or midpoint within the molding. Thus, the centerline or midpoint within the molding reach a much higher temperature than the outer section or surfaces.

FIG. 1 illustrates, in a schematic way, temperature time curves for a simple shaped molding as a thick plaque. As can be seen, each layer has its own peak exotherm but the centermost area has the highest peak exotherm temperature. As used herein, "peak internal exotherm" refers to this highest temperature within the molding obtained during compression molding of the molding compound. If there are several peak exotherms as when the compound is molded into a complex shape, peak internal exotherm refers herein to the last exotherm occurring within the molded composite normally in a region of the molding of thickest cross section.

The advantage of preheating is illustrated in Table 1 wherein layers of HSMC obtained from Dow Chemical Co. are molded at 700 psi and 300° F. into thick plaques. The molding compound contains 65% by weight E-glass fiber in a thickened dispersion comprising vinylester resin, thickener, catalyst, and mold release agent. The time to reach peak internal exotherm is measured by a thermocouple that continuously reads out temperature within the molding compound at its centermost portion.

TABLE 1

| | | EFFECT OF PREHEATING ON PEAK INTERNAL EXOTHERM TIME AND TEMPERATURE | | |
|---|---|---|---|---|
| Plaque Thickness (inch) | Preheat Temperature (°F.) | Time-to-Reach Peak Internal Exotherm (min.) | Time for Temperature Equalization (min.) | Peak Internal Exotherm Temperature °F. |
| 0.25 | None | 1.10 | 2.75 | 459 |
| 0.25 | 127 | 0.85 | 2.90 | 418 |
| 0.50 | None | 2.85 | 6.50 | 463 |
| 0.50 | 127 | 2.2 | 6.2 | 411 |

As can be seen from Table 1, not only is the time to reach the peak internal exotherm reduced by preheating but, also, the temperature at which the peak internal exotherm occurs is reduced by preheating thereby minimizing thermal gradients within the molding.

Figure 2:
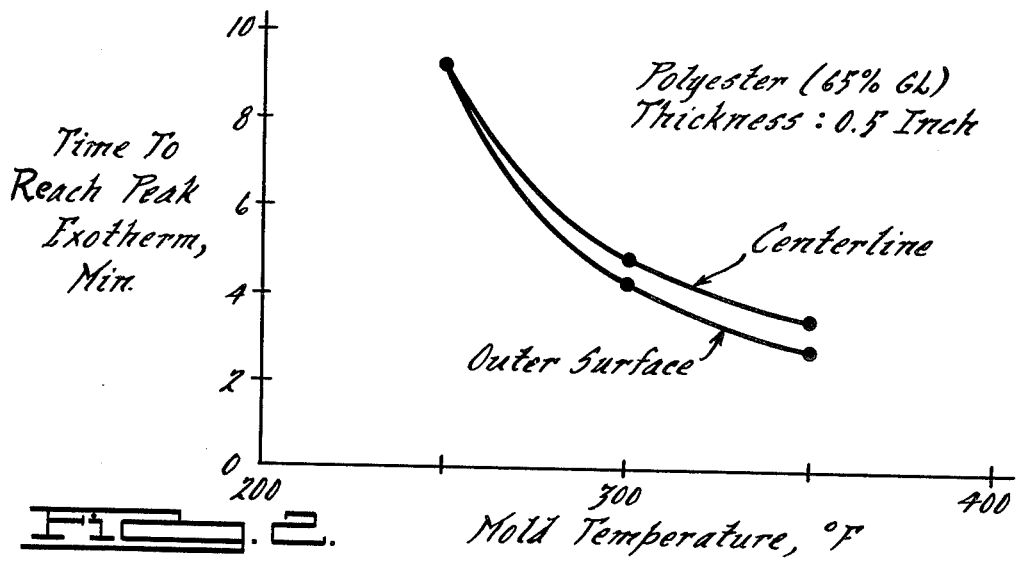
FIG. 2 illustrates the variation of time to reach a peak exotherm with changes in mold temperature at the centerline and outer surface of a molding compound during molding.
Figure 3:
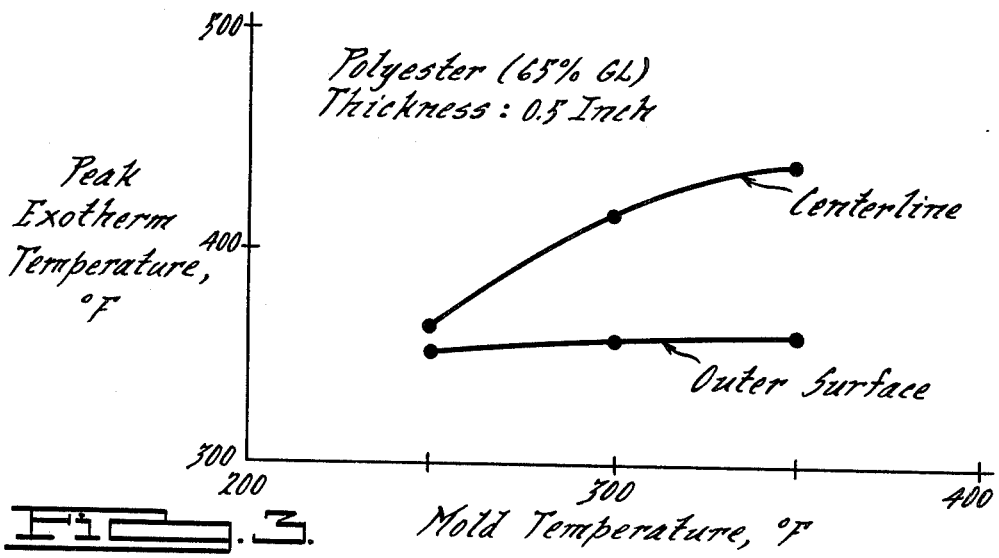
FIG. 3 illustrates the variation of temperature of the peak exotherm with changes in mold temperature for the outer surface and at the centerline of a molding compound during molding.

As can be seen from FIG. 2, however, showing moldings at 700 psi with layers of molding compound having X-oriented glass fibers (filament wound) and obtained from the Budd Company, the time to reach the peak internal exotherm is reduced at higher molding temperatures. As is seen from FIG. 3 using the same molding compound, the thermal gradient between the centerline and outer surface is significantly increased at higher molding temperatures. Such thermal gradients are disadvantageous as they can reduce mechanical properties of the final composite. Moreover, very high internal temperatures may cause volatilization of low molecular weight monomers and prepolymers. Thus, the benefit of preheating is apparent since it not only reduces the time to reach peak internal exotherm but also reduces the temperature gradients within the molding.

Preheating, however, is desirably such that volatilization of low molecular weight material, e.g., styrene or prepolymers thereof is kept to a minimum. Moreover, during molding it may be desirable to provide for evacuation of the mold so as to reduce or eliminate the effect of bubbling or blistering caused by evolution of gaseous materials.

After preheating, the molding compound is charged into the mold die wherein heat and pressure are applied. Typically such pressure is above about 200 psi, most often a peak pressure between about 400-4000 psi, although the principles herein should be applicable to molding thick section composites at other pressures. The usual molding procedure uses variable pressures so as first to force the molding compound to flow into the mold at lower pressure and then to apply the peak pressure on the molding compound throughout the mold. As used herein, peak pressure refers to this highest pressure employed and is calculated by dividing the force applied by the cross-sectional area of the molded composite. Mold temperatures with currently available molding compounds are between about 200°-500° F., most often below about 400° F., depending, of course, on the nature of the molding compound as well as, for example, desired characteristics of the part.

For structural benefits, it is desirable to provide a charge that covers at least about 50% and preferably up to about 90% of the surface area of the lower mold so as to permit greater flow, thus requiring a greater number of layers of molding compound than a fully covered mold. Larger numbers of layers will, however, normally lengthen the time to reach the peak internal exotherm. Of course, complex shapes may require a charge that varies in the number of layers.

Figure 4:
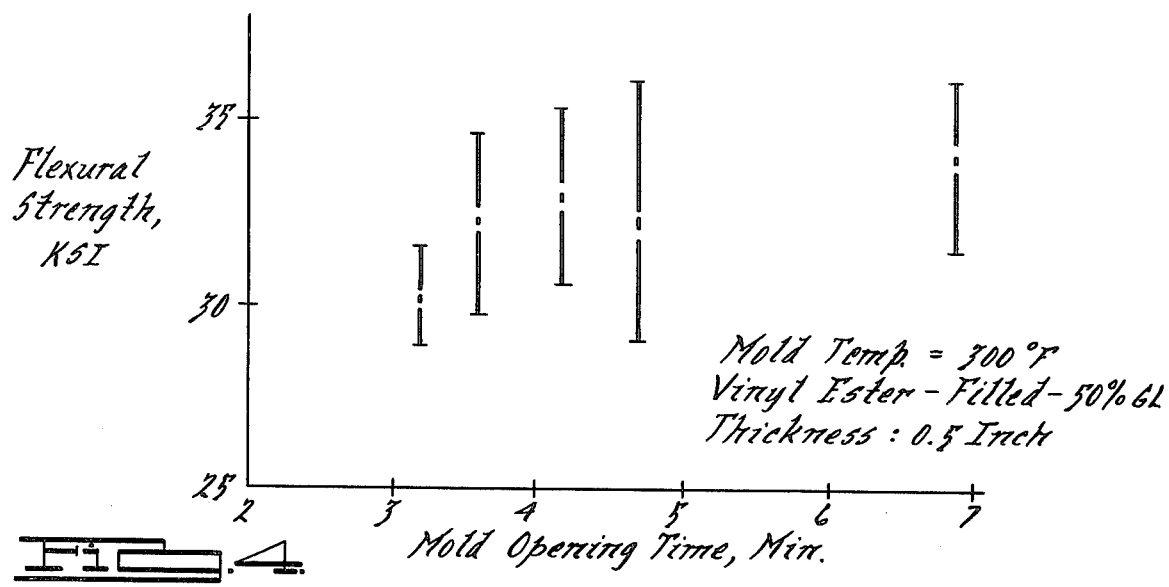
FIG. 4 illustrates flexural strength of molded composites as a function of mold opening time.
Figure 5:
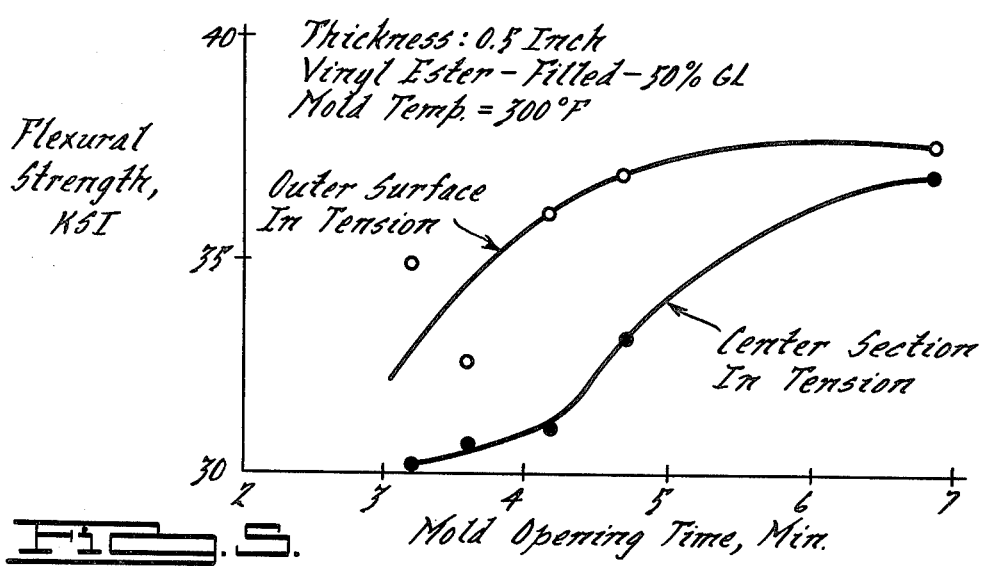
FIG. 5 illustrates flexural strength with outer surface or center section in tension as a function of mold opening time for the plaques of FIG. 4.

A plot of flexural strength vs mold cycle or opening time for 0.5 inch thick plaques is shown in FIG. 4 using Dow Chemical's vinyl ester HSMC that contains calcium carbonate filler at between 20-30% by weight. In each case eight samples were tested. The maximum and minimum values of flexural strength as well as the average value are indicated. For this particular thickness and molding compound formulation, the time to reach peak exotherm at the center was 4.2 minutes for these simple plaque shapes. The time for equalization of temperature across the thickness was 6.9 minutes. In this case, flexural strength increases only slowly with increasing mold opening time. However, more significant results are observed when the samples are tested in the following manner. Samples from the plaques whose flexural strengths are identified in FIG. 4 are cut in half through the center plane and tested for strength, one with the exposed center layer in tension and another with the outer skin in tension. FIG. 5 shows these results. At short times, the center has considerably lower strength than the outer skin indicating undercure. The slope of the curve starts increasing in the neighborhood of the time to reach peak exotherm indicating that the curing reaction is at its peak, after which the flexural strength approaches the limiting value slowly.

Figure 6:
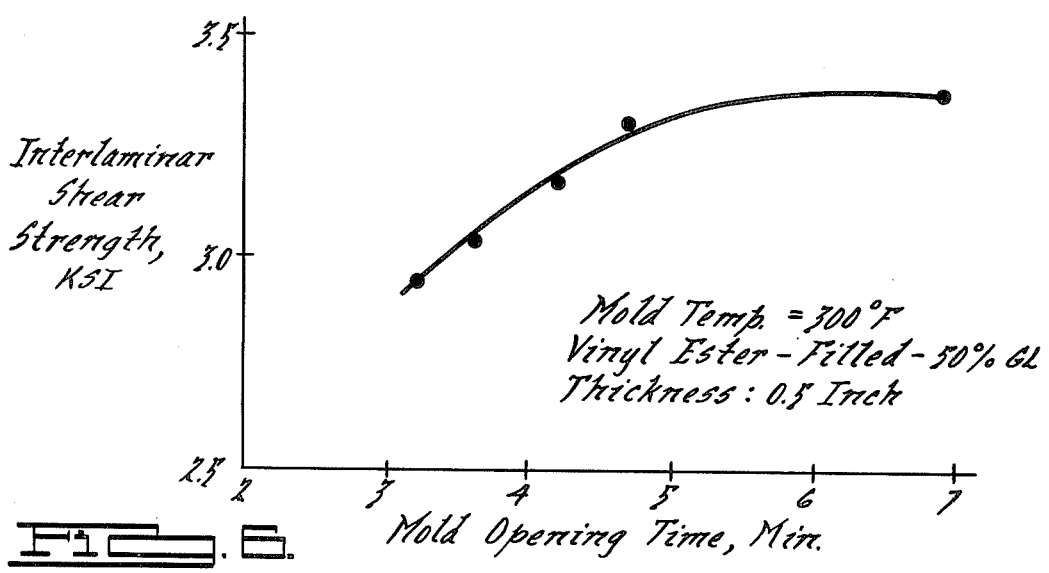
FIG. 6 illustrates the interlaminar shear strength of the plaques as a function of mold opening time.

Further evidence of undercure at short times is apparent in FIG. 6 which shows a plot of the interlaminar shear strength (ILSS) of the same plaques as a function of mold opening time. In order to assure shear failure through the neutral plane in a three point flexural test, the span-to-depth ratio was maintained between 4 to 5. There were no apparent interlayer cracks in these samples even for those with a mold opening time of 3.2 minutes. However, when the mold is opened at 6.9 minutes (equalization temperature) instead of 3.2 minutes, a 15-20 percent increase in ILSS is obtained.

Mold opening time has, accordingly, a strong influence on both flexural strength and interlaminar shear strength for thick section moldings. Often, these sections will not show any apparent crack or defect, but undercure due to insufficient time in the mold will introduce planes of weakness in the interior of the structure; and, under certain stress conditions, failure may occur in these planes. It is essential, therefore, that the mold opening time should be in excess of the time to reach peak internal exotherm in order to reach strength values approaching that inherent to the completely cured material. Preferably, the peak pressure applied to the molding compound during compression molding should not be released until at least after the peak internal exotherm occurs.

As is apparent from the foregoing, still further improvements of mechanical strengths are attainable if the molded composite remains in the mold until all temperature gradients are removed. Under many circumstances, however, such temperature equalization requires mold cycle times that are not economically feasible.

In the previous illustrations of FIGS. 1-5, the plaques were taken out of the mold at various mold opening times up to about the temperature equalization point and were then allowed to cool in air.

As shown in Table 2 below, flexural strength of such composites is influenced significantly depending upon the mode of post-cooling. Quenched specimens give lower strength, whereas specimens cooled in the mold at a very slow rate give the highest strength values. A slowly cooled part allows the curing reaction to proceed to completion and also, reduces any undesired thermal stresses. Where cooling the part in the mold is not practical from an economic viewpoint, cooling the part in an air circulating oven at a slightly elevated temperature is beneficial.

TABLE 2

EFFECT OF POST COOLING ON FLEXURAL STRENGTH

Mold Temperature = 300° F.
Mold Opening Time = 4.5 min.

| | Cases | Flexural Strength (Ksi) | |
|---|---|---|---|
| | | Outer Skin in Tension | Center Section in Tension |
| (i) | Part air cooled | 41 | 39 |
| (ii) | Part quenched in water at 70° F. | 36 | 37 |
| (iii) | Part cooled in oven at 150° F. | 43 | 42 |
| (iv) | Part cooled in mold | 46 | 48 |

It may be desirable then, from an economic standpoint, to use a slow cooling of the molded composite after removal from the mold and before equalization of the temperature within the molded composite. This may be accomplished, for example, by placing the molded composite in an air circulating heated oven or by other slow cooling means. It is estimated that an average cooling rate up to about 15° F./min., more preferably 5°-10° F./min. within the molded composite for the first 5-10 minutes should be sufficient to maintain optimum mechanical properties of the molded composite after removal from the mold, particularly where the composite is removed prior to temperature equalization. By average cooling rate is meant the change in average temperature of the composite with time where the average temperature is the average of the highest internal temperature and the surface temperature.

EXAMPLE 1

Fiberglass wheels were molded on a hard steel compression molding tool with commercially available Owens-Corning Fiberglass random glass fiber molding compound designated as SMC-R-50 and having a formulation believed generally corresponding to:

| Component | Parts by Weight |
|---|---|
| Resin (Polyester) | 100 |
| Filler (Calcium Carbonate) | 100 |
| Catalyst | 1 |
| Thickener | 5 |
| Release Agent (Zinc Stearate) | 5 |
| Glass Fiber | 105 |

The compression molding device was a Erie 1500 ton vertical press with a mold temperature of 300° F. and a mold closing setting of slow. A seven pound charge of the above molding compound comprised of 17 layers of molding compound with each layer being about 0.2 inch thick. A dielectric preheating (Thermall Model 300 dielectric heater) was used to raise the temperature of the layered charge to 180° F. from its ambient condition in about 50 seconds. A peak pressure of about 3000 psi was applied with a mold opening time of 5 minutes which exceeded the time to reach peak internal exotherm. A wheel of smooth, glossy surface was obtained upon cooling. The wheel included a 0.38 inch thick section.

EXAMPLE 2

The procedure of Example 1 was followed except that 9 layers of Dow Chemical Company molding compound having vinyl ester resin and believed to correspond to the formulation of Example 1 was employed. Again, after cooling, a smooth glossy wheel was obtained of the same dimensions as in Example 1.

What is claimed is:

1. A method of compression molding of layered compounds comprising reinforcing glass fiber, thermosetting ester or epoxy resin and catalyst in a thickened dispersion wherein heat and pressure are applied to form structural thermosets having thick sections above about one quarter inch, which method comprises:
   (A) dielectrically preheating the molding compound or portion thereof to a temperature at least about 100° F. and up to about 200° F. for less than about 2 minutes and without pregelling;
   (B) introducing the preheated molding compound into a mold which is maintained at a temperature in excess of about 220° F. but below that which causes premature gelling of the molding compound and so as to cover at least about 50% of the area of the lower mold surface;
   (C) applying a peak pressure of at least about 200 psi to the molding compound in the mold sufficient to cause its flow and filling of the mold to form a molded object;
   (D) maintaining the molded object in the mold at elevated pressure and temperature for a time in excess of that at which the peak internal exotherm occurs;
   (E) removing the molded object from the mold;
   (F) optionally, post-treating the molded object by allowing it to cool after removal from the mold at an average rate in a range of up to about 15° F. per minute for the first five minutes.

2. The method in accordance with claim 1, wherein the layered molding compound comprises about 30–70% by weight glass fiber.

3. The method in accordance with claim 2, wherein the reinforcing fiber comprises randomly oriented chopped glass fiber.

4. The method in accordance with claim 2, wherein the reinforcing fiber comprises long or continuous glass fibers.

5. The method in accordance with claim 2, wherein the molded object is post treated after removal from the mold to allow its cooling at an average rate of about 5° to 10° F./min.

* * * * *